United States Patent [19]

Deuring et al.

[11] Patent Number: 4,919,090
[45] Date of Patent: Apr. 24, 1990

[54] MOUNTING AID FOR INSTALLING VALVE ACTUATING ELEMENTS

[75] Inventors: Hans Deuring, Burscheid; James H. Maquire, Langenfeld; Clifford R. Worsley, Leverkusen, all of Fed. Rep. of Germany; Martin J. Whitehead, Sevenoaks, England

[73] Assignee: Goetze AG, Burscheid, Fed. Rep. of Germany

[21] Appl. No.: 351,518

[22] Filed: May 15, 1989

[30] Foreign Application Priority Data

May 13, 1988 [DE] Fed. Rep. of Germany ....... 3816321
Mar. 4, 1989 [DE] Fed. Rep. of Germany ....... 3907001

[51] Int. Cl.⁵ ............................ F01L 3/08; F01L 3/10
[52] U.S. Cl. .............................. 123/90.67; 123/188 P
[58] Field of Search ........................ 123/90.67, 188 P

[56] References Cited

U.S. PATENT DOCUMENTS

| | | | |
|---|---|---|---|
| 1,191,658 | 7/1916 | Brown | 123/90.67 |
| 2,878,799 | 3/1959 | Brenneke | 123/188 P |
| 3,094,976 | 6/1963 | May | 123/90.67 |
| 3,829,105 | 8/1974 | Kammeraad | 123/188 P |
| 3,910,586 | 10/1975 | Todaro | 123/188 P |
| 4,602,598 | 7/1986 | Moore | 123/188 P |
| 4,822,061 | 4/1989 | Kammeraad | 123/90.67 |

Primary Examiner—Charles J. Myhre
Assistant Examiner—Weilun Lo
Attorney, Agent, or Firm—Spencer & Frank

[57] ABSTRACT

A mounting aid arranged for receiving a valve-actuating sub-assembly intended for installation coaxially about a valve stem. The sub-assembly includes a valve coil spring, a spring retainer having a central aperture and a split collar. The mounting aid has a closing disc having an outer circumference and being arranged for engaging an outer radial surface of the spring retainer coaxially therewith; an axial extension attached to the closing disc at the outer circumference thereof; and hold-back means formed on the end of the extension for releasably securing the sub-assembly to the axial extension.

22 Claims, 2 Drawing Sheets

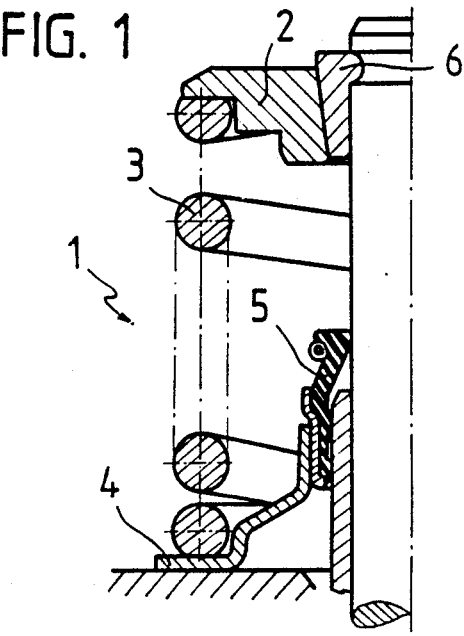
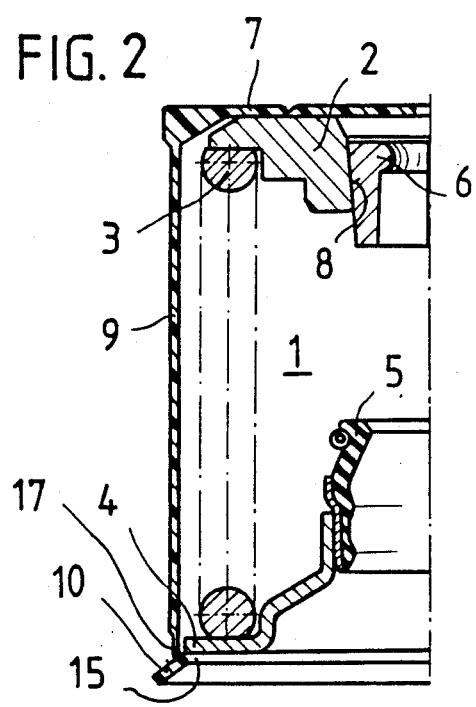
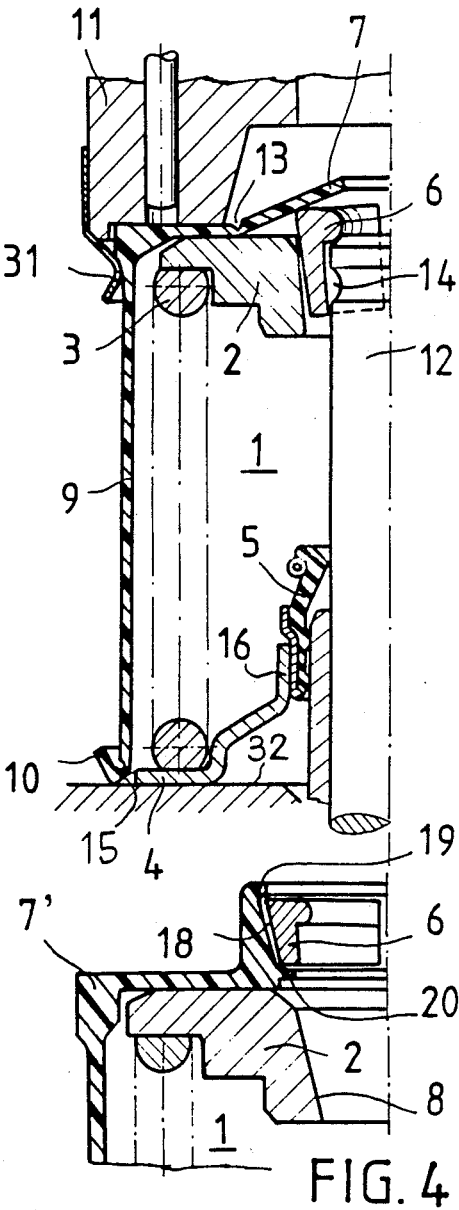

MOUNTING AID FOR INSTALLING VALVE ACTUATING ELEMENTS

CROSS REFERENCE TO RELATED APPLICATION

This application claims the priority of Federal Republic of Germany Application Nos. P 38 16 321.7 filed May 13, 1988 and P 39 07 001.8 filed Mar. 4, 1989, which are incorporated herein by reference.

BACKGROUND OF THE INVENTION

This invention relates to a mounting aid for a sub-assembly of actuating elements for tappet valves of internal combustion engines. The sub-assembly has at least one coil spring adapted to coaxially surround the valve stem and extending axially from a valve spring support disc (hereafter "spring retainer") and may be bounded at its other end by a spring seat ring. Segmented locking wedges (hereafter "split collar") are accommodated in a central conical opening of the spring retainer and are held in place by a closing disc which partially blocks the conical opening. The closing disc, which constitutes the mounting aid, prevents the split collar from falling out of the conical opening.

The above-outlined arrangement is disclosed, for example, in U.S. Pat. No. 2,855,915. During the mounting of the sub-assembly in the internal combustion engine, the split collar is shifted by the valve stem axially in the direction of the closing disc, whereby the inner diameter of the split collar is increased to such an extent that the valve stem can be axially pushed therethrough. At the same time, the elastomer closing disc exerts an axial return force on the split collar so that upon reaching the corresponding circumferential groove in the valve stem, the split collar is returned into its original radial position and thus the spring retainer is axially immobilized relative to the valve stem.

The closing disc is designed to remain connected with the spring retainer after the mounting operation and can then function as a sealing body which seals the valve stem from lubricant oil. This circumstance, however, leads in present-day engines to an insufficient lubrication of the valve stem seals, as a result of which the sealing lips of the valve stem seals are exposed to increased wear. It is a further disadvantage of known mounting aids of this type that for securing the spring retainer only a split collar having a radially oriented projection formed as a circumferential web can be used for cooperating with a corresponding groove provided circumferentially in the valve stem, for the purpose of an axial immobilization of the wedges on the valve stem.

SUMMARY OF THE INVENTION

It is an object of the invention to provide an improved mounting aid of the above-outlined type which makes possible an installation of all valve actuating elements as a one-piece unit in the internal combustion engine. The valve actuating elements are the spring retainer together with the split collar as well as the valve spring and a spring seat ring underneath the spring retainer.

This object and others to become apparent as the specification progresses, are accomplished by the invention, according to which, briefly stated, at the outer circumference of the closing disc an axial extension is provided which is releasably connected with that end of the valve spring or the spring seat ring which is remote from the spring retainer.

By virtue of the invention as outlined above, it is feasible to install all valve actuating elements simultaneously into the internal combustion engine with a single mounting tool. Apart from the substantially simplified final assembly, the transport and storage of the individual components are also significantly facilitated.

According to a preferred embodiment of the invention, the axial extension is formed of at least two diametrically oppositely located holding members (panels). Dependent upon the availability of space as well as the axial spring forces, in accordance with another preferred embodiment, the axial extension is formed as a cylindrical sleeve. The free terminal portion of the diametrically opposite holding members or the sleeve has a constriction and a conically outwardly flaring terminal skirt. This arrangement functions as an automatic releasing mechanism which separates the mounting aid from the valve actuating elements after the final positioning thereof following installation. The holding members or the sleeve are elastically deformable.

Since in many engines split collars with a plurality of axially superposed circumferential webs are used, according to a further feature of the invention, the closing disc has, externally of the conical aperture of the spring retainer, a holding device for receiving the split collar. The inner diameter of the holding device is so dimensioned that prior to installation into the internal combustion engine the inner diameter of the split collar is at least as large as the valve stem diameter. This ensures that during assembly, the split collar on the one hand and the valve stem on the other hand are initially out of contact with one another, whereby the use of a split collar with a plurality of circumferential webs is possible without the risk that the structural components abut and jam the assembling process. For ensuring a reliable immobilization of the split collar, the holding device is a tubular member which surrounds the split collar and which has axial abutments at its end zones. To connect the split collar with the valve stem, the split collar is, by means of a tool, radially shifted in the direction of the valve stem. In order to ensure that the tool is capable of shifting the split collar into a positionally correct state, in the zone of the split collar the tubular member has lateral openings through which the tool projects. Such openings maybe formed by subdividing the tubular member into at least two segments by axial cuts.

BRIEF DESCRIPTION OF THE DRAWING

FIG. 1 is an axial sectional view of valve actuating elements shown in an assembled state and adapted to be handled by the mounting aid according to the invention.

FIG. 2 is an axial sectional view of a mounting aid according to a preferred embodiment of the invention, containing valve actuating elements.

FIG. 3 is a view similar to FIG. 2, additionally showing a mounting tool in the process of installing the valve actuating elements with the mounting aid according to the invention.

FIG. 4 is a fragmentary sectional elevational view of another preferred embodiment of the invention.

DESCRIPTION OF THE PREFERRED EMBODIMENTS

Figure 7:
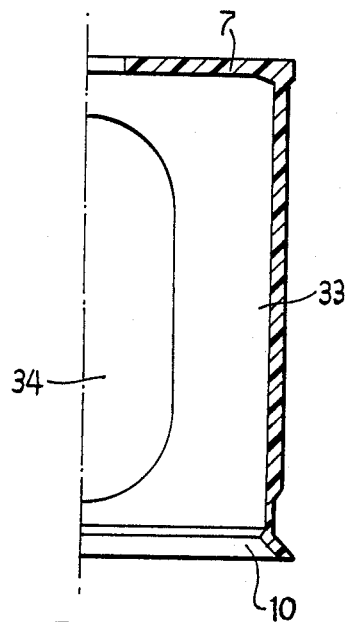
FIG. 7 is a sectional elevational view of a further preferred embodiment of the invention.

Turning to FIG. 1, there are illustrated therein valve actuating elements generally designated at 1 which are required for the operation of the exhaust and intake valves of present-day internal combustion engines. The valve elements comprise a spring retainer 2, a valve spring 3, a spring seat ring 4, a valve stem seal 5 as well as a two-part (split) collar 6.

In FIG. 2 there is illustrated a mounting aid structured according to the invention and shown together with the valve actuating element sub-assembly 1 prior to installation. The mounting aid includes a closing disc 7 which extends over the end face of the spring retainer 2 and by means of which the split collar 6 is prevented from dropping out of a central aperture 8 of the spring retainer 2. The split collar 6 is prevented from falling out in the opposite axial direction by the outer conical shape of the split collar 6 cooperating with a corresponding conical configuration of the opening 8 provided in the spring retainer 2.

The closing disc 7 has an axial extension formed as a cylindrical sleeve 9. At its end remote from the closing disc 7, the cylindrical sleeve 9 terminates in a conical skirt 10 which has an inner hold-back edge 15 which, in the skirt position shown in FIG. 2, extends obliquely inwardly and constitutes a lock for the sub-assembly 1, preventing the latter from sliding out of the sleeve 9.

All the other components of the valve-actuating sub-assembly 1 are axially tensioned between the snap-in connection 15 and the closing disc 7 so that a complete (self-contained) mounting unit can be handled by an automatic installing machine.

Turning now to FIG. 3, for effecting installation of the valve-actuating sub-assembly 1 into the internal combustion engine, a tool 11 presses the structural unit over a valve stem 12. The outer peripheral edge of the skirt 10 comes to rest on a supporting surface 32. As the tool further presses down and increasingly compresses the spring 3 the tool force which presses the sleeve 9 against the supporting surface 32 and the tool force which urges the spring seat ring 4 against the inwardly sloping hold-back edge 15 of the skirt 10, cause the skirt 10 to swing (flip) outwardly by virtue of a weakened circumferential portion 17, whereby, as illustrated in FIG. 3, the hold-back edge 15 has moved away from under the spring seat ring 4, thus releasing the same. The valve spring 3 is compressed by virtue of a further axial pressing of the valve-actuating sub-assembly 1 by means of the tool 11. The split collar 6 first shifts axially relative to the spring retainer 2 towards the tool 11. This relative motion is made possible by the resilient construction of the closing disc 7 in the zone of the split collar 6. An axial resiliency of the closing disc 7 is made possible by a circular zone 13 of reduced thickness above the spring retainer 2. The valve spring 3 is compressed by the tool 11 to such an extent as to ensure that the web portions of the split collar 6 project into the circumferential groove 14 of the valve stem 12. Upon subsequent release of the valve spring 3 the entire valve-actuating sub-assembly 1 is positioned operationally correctly in the internal combustion engine. Thereafter, the tool 11 is removed whereby a holding device 31 connected with the tool 11 pulls the disc 7, together with the sleeve 9, off the valve actuating sub-assembly 1.

Turning now to FIG. 4, there is illustrated therein a modified mounting aid which, in order to receive and position the split collar 6 at a time prior to the installation of the valve-actuating sub-assembly 1 in the engine, has a central holding device 18 which is formed on the closing disc 7' and whose inside wall conically tapers towards the spring retainer 2. The split collar 6 is prevented from falling out by means of radially oriented axial stops 19 and 20. During installation, an additional (not illustrated) tool engages the split collar 6 at its end face and pushes it axially into the opening 8 of the spring retainer 2.

Figure 5:
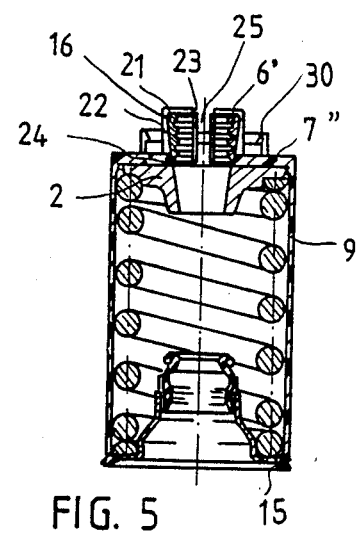
FIG. 5 is a sectional elevational view of still a further preferred embodiment of the invention

Turning now to FIG. 5, there is shown therein another preferred embodiment of the invention, particularly for a split collar 6' which has a plurality of axially superposed circumferential webs 16. The closing disc 7'' has a holding device 21 which comprises a tubular part 22 that surrounds the split collar 6' and which has at its ends axial abutments 23 and 24 which prevent a dropping out of the slit collar 6' during storage and transportation. The holding device 21 has individual segments which are formed by axial cuts 25 provided in the tubular part 22. The structure of the axial extension sleeve 9 is identical to that described in connection with the embodiment shown in FIG. 2.

Figure 6:
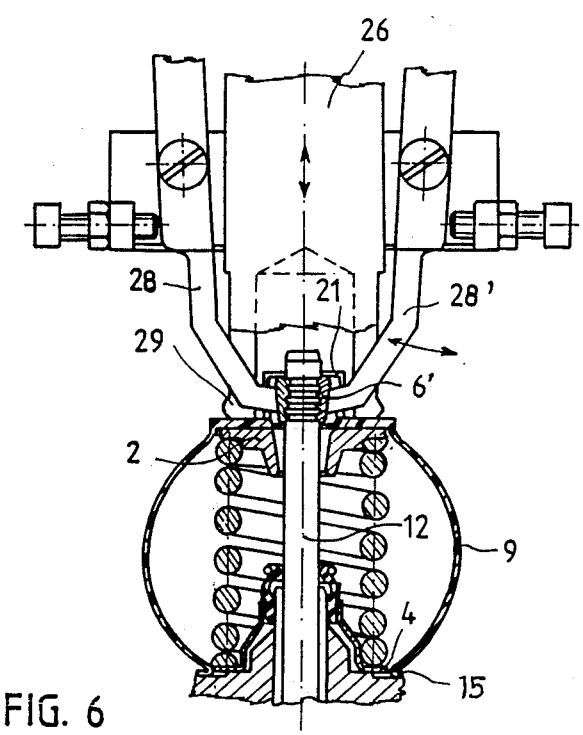
FIG. 6 is a sectional elevational view showing the embodiment according to FIG. 5 and additionally showing a mounting tool depicted during the installing operation.

Turning now to FIG. 6, there is illustrated therein the installation process practiced with the mounting aid shown in FIG. 5. A tool 26 presses the mounting aid to such an extent over the valve stem 12 until its end zone which is to receive the split collar 6' projects through the holding device 21. In this position, the conical skirt 15 of the sleeve 9 flips outwardly and simultaneously, the sleeve 9 bulges radially and frees itself from the spring seat ring 4, as described in connection with the embodiment shown in FIGS. 2 and 3. Radially adjustable spring arms 28, 28' of the tool 26 project through the slots 25 (FIG. 5) of the tube portion 22 and press the split collar 6' radially onto the valve stem 12. Thereafter, the tool 26 is lifted off the valve stem 12. As a result, the spring retainer 2 is displaced upwardly in the direction of the split collar 6' until a connection of the spring retainer 2 with the valve stem 12 is established. The mounting aid which has already been freed from the spring seat ring 4 is pulled off by means of a holding device 29 which cooperates with holding portions 30 (FIG. 5). The mounting aid may be re-used by positioning herein a new sub-assembly 1. After the insertion thereof into the mounting aid, the skirt 10 thereof is flipped back from the position shown in FIG. 3 or 6 into the position shown in FIGS. 2 or 5 in which the hold-back edge 15 assumes its locking position.

Turning now to FIG. 7, the preferred embodiment illustrated therein differs from that shown in FIGS. 2 and 3 only in that instead of a cylindrical sleeve a plurality of spaced legs or panels 33 (holding members) are provided (only one shown in FIG. 7 which illustrates one symmetrical half of the construction), separated from one another by a space 34. FIG. 7 illustrates a construction which has two diametrically opposite panels 33.

It will be understood that the above description of the present invention is susceptible to various modifications, changes and adaptations, and the same are intended to be comprehended within the meaning and range of equivalents of the appended claims.

What is claimed is:

1. A mounting aid arranged for receiving a valve-actuating sub-assembly intended for installation coaxially about a valve stem, the sub-assembly including a valve coil spring, a spring retainer having a central aperture and a split collar, comprising
   (a) a closing disc having an outer circumferential portion and being arranged for engaging a radially extending surface of the spring retainer coaxially therewith;
   (b) an axial extension attached to said closing disc at the outer circumferential portion thereof; said axial extension having an end remote from said closing disc; and
   (c) hold-back means formed on said end of said extension for releasably securing the sub-assembly to the axial extension.

2. A mounting aid as defined in claim 1, wherein said axial extension comprises a plurality of spaced holding panels.

3. A mounting aid as defined in claim 1, wherein said axial extension comprises two diametrically opposite holding panels.

4. A mounting aid as defined in claim 1, wherein said axial extension comprises a cylindrical sleeve, and said closing disc forms a radial base of the sleeve.

5. A mounting aid as defined in claim 4, wherein said sleeve has a circumferential zone of reduced thickness at said end; further wherein said hold-back means comprises a terminal skirt extending conically outwardly and away from said sleeve at said circumferential zone and having an inner circumferential hold-back edge; said terminal skirt having a first position relative to the sleeve in which said hold-back edge is situated inwardly of said sleeve and arranged to engage the sub-assembly if situated in the sleeve; said terminal skirt having a second position relative to the sleeve in which said hold-back edge is situated externally of said sleeve for allowing the sub-assembly, if situated in the sleeve, to move axially out of said sleeve.

6. A mounting aid as defined in claim 5, wherein said sleeve is elastically deformable.

7. A mounting aid as defined in claim 1, further comprising a holding device formed on said closing disc in a central region thereof and extending from said closing disc axially in a direction opposite to the axial orientation of said axial extension; said holding device being arranged to hold the split collar on said closing disc in an axial alignment therewith and in a spread-apart state.

8. A mounting aid as defined in claim 7, wherein said holding device comprises a tubular part having inwardly projecting end portions arranged to extend radially over the split collar when situated in said tubular part.

9. A mounting aid as defined in claim 8, wherein said end portions are radially inwardly extending axial abutments.

10. A mounting aid as defined in claim 8, wherein said tubular part has lateral openings allowing access to the split collar when situated in said tubular part.

11. A mounting aid as defined in claim 8, wherein said tubular part has axial cuts subdividing the tubular part into at least two segments.

12. A preassembled structural unit comprising
   (a) a valve-actuating sub-assembly for installation coaxially about a valve stem; said sub-assembly including
      (1) a valve coil spring,
      (2) a spring retainer engaging an end of the coil spring and having a central opening therein and
      (3) a split collar being in alignment with said central opening; and
   (b) a mounting aid holding said sub-assembly together and including
      (1) a closing disc having an outer circumferential portion and engaging a radially extending surface of the spring retainer coaxially therewith;
      (2) an axial extension attached to said closing disc at the outer circumferential portion thereof and extending along said valve coil spring; said axial extension having an end remote from said closing disc; and
      (3) hold-back means formed on said end of said extension for releasably securing the sub-assembly to the axial extension.

13. A preassembled structural unit as defined in claim 12, wherein said axial extension comprises a plurality of spaced holding panels.

14. A preassembled structural unit as defined in claim 12, wherein said axial extension comprises two diametrically opposite holding panels.

15. A preassembled structural unit as defined in claim 12, wherein said axial extension comprises a cylindrical sleeve, and said closing disc forms a radial base of the sleeve.

16. A preassembled structural unit as defined in claim 15, wherein said sleeve has a circumferential zone of reduced thickness at said end; further wherein said hold-back means comprises a terminal skirt extending conically outwardly and away from said sleeve at said circumferential zone and having an inner circumferential hold-back edge; said terminal skirt having a first position relative to the sleeve in which said hold-back edge is situated inwardly of said sleeve and engages the sb-assembly situated in the sleeve; said terminal skirt having a second position relative to the sleeve in which said hold-back edge is situated externally of said sleeve for allowing the sub-assembly to move axially out of said sleeve.

17. A preassembled structural unit as defined in claim 16, wherein said sleeve is elastically deformable.

18. A preassembled structural unit as defined in claim 12, further comprising a holding device formed on said closing disc in a central region thereof and extending from said closing disc axially in a direction opposite to the axial orientation of said axial extension; said holding device accommodating and holding the split collar on said closing disc in a spread-apart state and in an axial alignment with said central opening of said spring retainer.

19. A preassembled structural unit as defined in claim 18, wherein said holding device comprises a tubular part having inwardly projecting end portions extending radially over the split collar situated in said tubular part.

20. A preassembled structural unit as defined in claim 19, wherein said end portions are radially inwardly extending axial abutments.

21. A preassembled structural unit as defined in claim 19, wherein said tubular part has lateral openings allowing access to the split collar situated in said tubular part.

22. A preassembled structural unit as defined in claim 19, wherein said tubular part has axial cuts subdividing the tubular part into at least two segments.

* * * * *